(12) United States Patent
Chen et al.

(10) Patent No.: US 10,365,397 B2
(45) Date of Patent: Jul. 30, 2019

(54) CONTAINER INSPECTION SYSTEM AND PORT FACILITY

(71) Applicant: NUCTECH COMPANY LIMITED, Beijing (CN)

(72) Inventors: Zhiqiang Chen, Beijing (CN); Yuanjing Li, Beijing (CN); Shangmin Sun, Beijing (CN); Yu Hu, Beijing (CN); Yuan Ma, Beijing (CN); Qiangqiang Wang, Beijing (CN); Long Du, Beijing (CN); Wei Li, Beijing (CN)

(73) Assignee: NUCTECH COMPANY LIMITED, Beijing (CN)

(*) Notice: Subject to any disclaimer, the term of this patent is extended or adjusted under 35 U.S.C. 154(b) by 0 days.

(21) Appl. No.: 15/691,747

(22) Filed: Aug. 31, 2017

(65) Prior Publication Data
US 2018/0059282 A1     Mar. 1, 2018

(30) Foreign Application Priority Data

Aug. 31, 2016 (CN) .......................... 2016 1 0786653

(51) Int. Cl.
*G01V 5/00* (2006.01)
*B66C 13/16* (2006.01)
*B66C 19/00* (2006.01)

(52) U.S. Cl.
CPC ............ *G01V 5/0066* (2013.01); *B66C 13/16* (2013.01); *B66C 19/002* (2013.01); *G01V 5/0008* (2013.01)

(58) Field of Classification Search
CPC .... B66C 13/16; B66C 19/002; G01V 5/0008; G01V 5/0066
See application file for complete search history.

(56) References Cited

U.S. PATENT DOCUMENTS

| 7,780,390 B2 * | 8/2010 | Fujiwara ............. G01V 5/0008 378/198 |
| 2003/0108150 A1 | 6/2003 | Franke |
| 2004/0156477 A1 | 8/2004 | Bjorkholm |
| 2006/0042397 A1 | 3/2006 | Kurita et al. |
| 2008/0122234 A1 * | 5/2008 | Alioto .................. B66C 19/002 294/81.1 |

FOREIGN PATENT DOCUMENTS

KR     20060112632 A     11/2006

* cited by examiner

*Primary Examiner* — Mark R Gaworecki
(74) *Attorney, Agent, or Firm* — Kilpatrick Townsend & Stockton LLP

(57) ABSTRACT

The present application relates to a container inspection system, comprising a radiation source (31), a radiation detection apparatus and a quay crane for hoisting a container onto an automated guided vehicle, said radiation source (31) and said radiation detection apparatus being provided on said quay crane, for performing a scanning inspection on said container loaded on said vehicle. The present application, which does not need a special allocation of approach of the radiation source and the radiation detection apparatus, conveniently effectuates scanning inspection of a container, and improving the inspection efficiency.

12 Claims, 3 Drawing Sheets

CONTAINER INSPECTION SYSTEM AND PORT FACILITY

CROSS REFERENCE TO RELATED APPLICATION

The present application claims the priority to Chinese Patent Application No. 201610786653.6, titled "CONTAINER INSPECTION SYSTEM AND PORT FACILITY", filed on Aug. 31, 2016 with the State Intellectual Property Office of the PRC, which is incorporated herein by reference in its entirety.

FIELD OF THE INVENTION

The present application relates to the field of a security inspection technique, and in particular relates to a container inspection system and a port facility.

BACKGROUND OF THE INVENTION

The existing container inspection system is commonly in such categories as a fixed gantry category, a mobile gantry category or a vehicle mounted category. Among them, the container inspection system of a fixed gantry category, is fixed on a passage in such an inspection manner that an article to be inspected passes through a scanning passage to accomplish the scanning. While a mobile gantry category and a vehicle mounted category are in such a scanning inspection manner that a radiation source and a detector move, while an article to be scanned is fixed. Specifically for a container system of a vehicle mounted category, its inspection system uses a universal truck chassis for carriage, and utilizes movement of a chassis vehicle to achieve the mobility of the entire inspection system. However, a mobile gantry category uses a track means, to achieve the mobility of the entire inspection system by means of a drive means on the track.

In the above container inspection systems of a vehicle mounted category and a mobile gantry category, the vehicle mounted category would be limited by emission of the chassis vehicle, left rubber/right rudder as well as other relevant road regulations, while the mobile gantry category is correspondingly limited with a need for use at a fixed site.

For an intelligent and integrated port, there is a substantial use of unmanned automated guided vehicle (Automated Guided Vehicle, referred to as AGV for short) system. A movable container inspection system as a part of a port makes it necessary for centralized management and control, and makes it necessary for effectuating unattended operation on an inspection system, but such two movement manners are both hard to adapt to the demands of current intelligent ports.

On the other hand, for partial intelligent ports, especially intelligent ports that have already been implemented and accomplished in planning, the movement of AGV needs to perform lane-changing and steering at any position, without a fixed path. At the same time, magnetic nails of an equipment that guides an AGV are throughout the entire AGV advancing site, it is rather difficult for secondary civil engineering on the basis of the container inspection system, and moreover, it is also hard to find a fixed area to achieve passage of all AGV equipment.

SUMMARY OF THE INVENTION

The object of the present application is to provide a container inspection system and a port facility, which is capable of more conveniently effectuating scanning inspection of a container, and improving the inspection efficiency.

In order to achieve the objective above, the present application provides a container inspection system, comprising a radiation source, a radiation detection apparatus and a quay crane for hoisting a container onto an automated guided vehicle, said radiation source and said radiation detection apparatus being provided on said quay crane, for performing a scanning inspection on said container loaded on said vehicle.

Further, said quay crane is movable, such that said radiation source and said radiation detection apparatus move along with the quay crane to a loading position on which the quay crane hoists said container onto said vehicle, so as to perform a scanning inspection of said container on said vehicle.

Further, said radiation detection apparatus comprises a detector, and an L-type cantilever on which said detector is provided, said L-type cantilever being connected to a mounting structure of said radiation source to form a door-type frame for passage of the vehicle loaded with the container.

Further, when said quay crane hoists the container onto said vehicle, said radiation source and said radiation detection apparatus are located at a front side or a rear side of said vehicle and spaced from said vehicle by a predetermined distance.

Further, the container inspection system comprising a power supply unit for supplying power to said radiation source, said detector or/and said quay crane.

Further, said L-type cantilever is rotatably connected to the mounting structure of said radiation source, so that the L-type cantilever is able to be switched between a deployed state and a retracted state.

Further, when said radiation source and said radiation detection apparatus move along with said quay crane, said L-type cantilever is folded to be in said retracted state.

Further, when said quay crane reaches said loading position, said L-type cantilever is stretched to be in said deployed state.

Further, said radiation source and said radiation detection apparatus have an overall width that is no greater than a width of an advancing passage of said vehicle.

Further, said radiation source and said radiation detection apparatus are mounted on a lateral frame or a bottom frame of one side of said quay crane proximate to said vehicle advancing site.

Further, said radiation source and said radiation detection apparatus are adjacent to the front side or the rear side of said vehicle.

The present application also provides a port facility, comprising the container inspection system.

Further, the port facility comprising automated guided vehicles for carrying a container.

On the basis of the above-mentioned technical solution, the present application by mounting a radiation source and a radiation detection apparatus at a quay crane enables them to move together along with the quay crane, so as to utilize the radiation source and the radiation detection apparatus that are moved in place to perform scanning inspection of an automated guided vehicle, upon arrival at a loading position when the quay crane accomplishes loading a container of the automated guided vehicle. In this process, the radiation source and the radiation detection apparatus move along with the quay crane. In other words, there is no need for a special allocation of approach of the radiation source and the radiation detection apparatus, so that it is capable of more conveniently effectuating scanning inspection of a container, and improving the inspection efficiency. Compared with an existing vehicle-mounted container inspection system, the present application neither needs to renovate a site of the automated guided vehicle, and nor needs to occupy a fixed area.

BRIEF DESCRIPTION OF THE
ACCOMPANYING DRAWINGS

The drawings described herein are used to provide a further understanding of the present application and constitute a part of the present application. The illustrative embodiments of the present application as well as the descriptions thereof, which are used for explaining the present application, do not constitute improper definitions on the present application. In the drawings.

DETAILED DESCRIPTION OF THE
PREFERRED EMBODIMENTS

Next, the technical solution of the present application is further described in detail by means of the drawings and embodiments.

With regard to several disadvantages present in the existing container inspection system which is mounted on vehicle. The inventor, after investigation of an intelligent port, it is noticed that when a container is loaded onto an AGV by an automatic quay crane, the quay crane needs to be moved to a corresponding loading position, while an AGV loaded with a container is preferably subject to scanning inspection in the vicinity of the loading position if it is required to perform scanning inspection. On the other hand, the inventor also notes that the AGV would continue to travel a distance after loading of the container is completed. The inventor proposes in the present application a technical concept of moving a radiation source and a radiation detection apparatus along with a quay crane, and utilizing a movement process of the quay crane to allow the inspection system to move along therewith to the loading position, so that the inspection system at the loading position conveniently performs scanning inspection of AGV when the AGV departs from the loading position.

On the basis of the aforementioned concept, the present application proposes a container inspection system of the present application, the container inspection system comprising: a radiation source and a radiation detection apparatus, which are mounted on a quay crane and move along with the quay crane to the loading position of an AGV, so as to perform scanning inspection of the AGV after loading of the container is finished.

Hereinafter, various embodiments of the container inspection system of the present application will be described in detail in combination with FIGS. 1-6.

Figure 1:
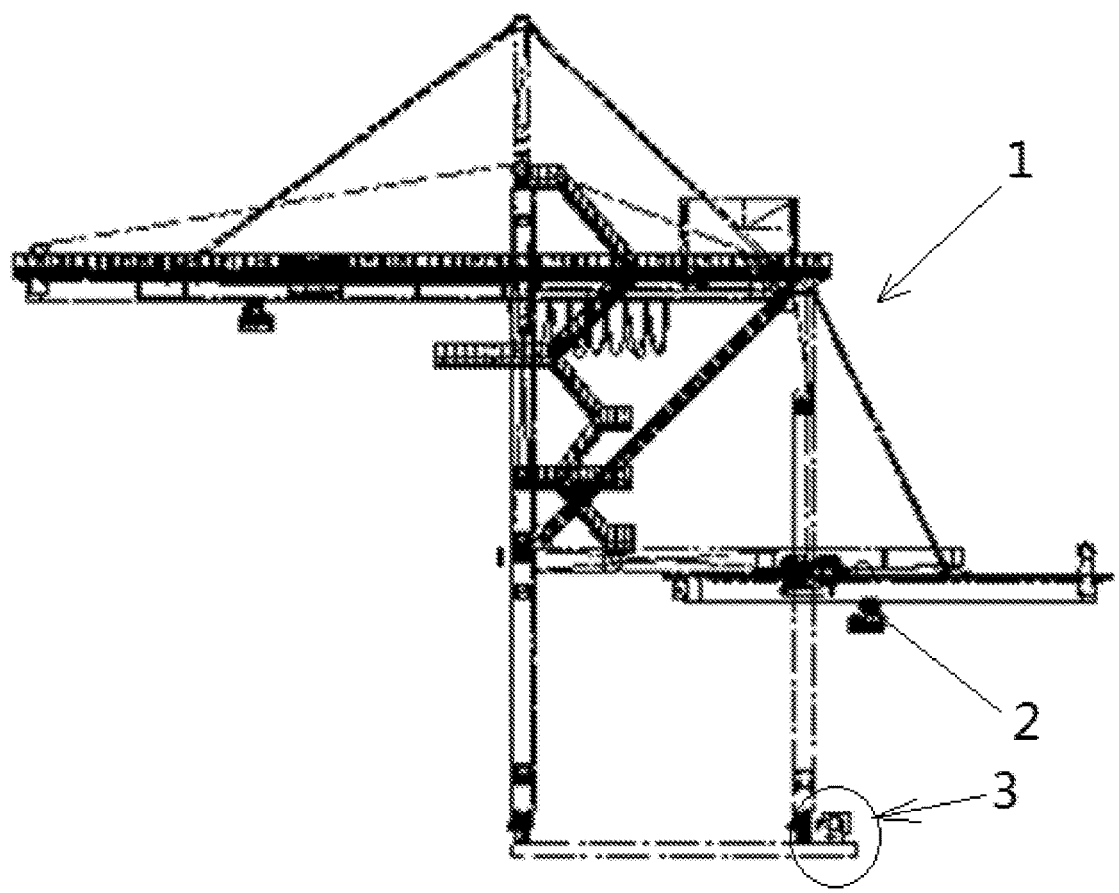
FIG. 1 is a schematic view of an embodiment of the container inspection system of the present application applied at an intelligent port.

As shown in FIG. 1, it is a schematic view of an embodiment of the container inspection system of the present application applied at an intelligent port. In FIG. 1, an automatic quay crane 1 which is capable of moving in an intelligent port, hoists the container with cargo on a ship to an AGV which is in an AGV advancing site at a right side of the quay crane. According to the allocation of the control system, the automatic quay crane 1 and the AGV ready to load this container with cargo both move to a given loading position. When the automatic quay crane 1 and the AGV are both in the loading position, a lifting apparatus 2 of the automatic quay crane 1 may place the container on the AGV, then the container is carried away by the AGV.

Figure 2:
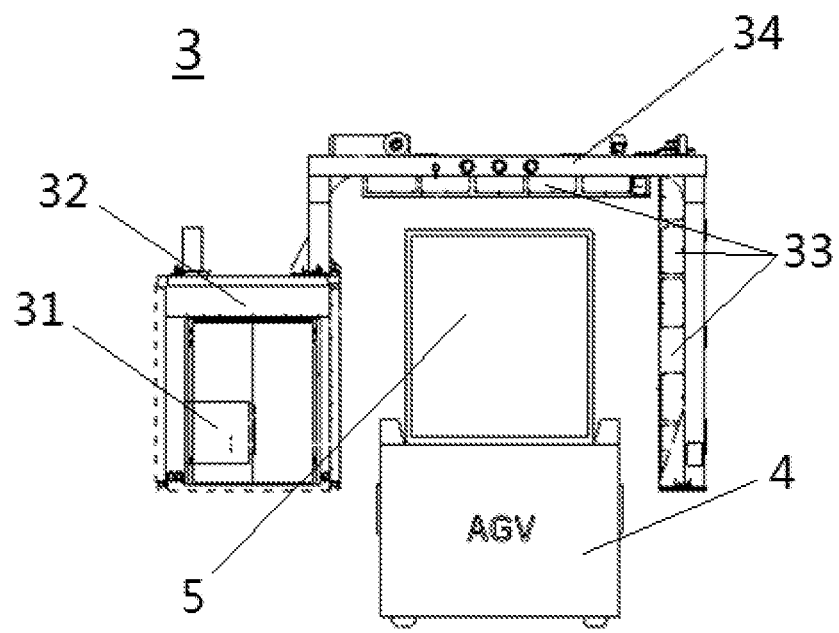
FIG. 2 is an enlarged schematic view of an embodiment of the container inspection system of the present application shown in the circle portion of FIG. 1.

The portion marked at the right lower corner of FIG. 1 is a container inspection system 3, which is located at one side of the automatic quay crane 1 and mounted on the automatic quay crane 1. In FIG. 2, the container inspection system comprises a radiation source 31 and a radiation detection apparatus.

The radiation detection apparatus comprises a radiation source 31 (a radioactive source), which emits radiation for scanning a container to be detected, while the radiation detector 33 is used for receiving the radiation transmitted by the radiation source 31 when scanning the container to be detected, such as to acquire an interior condition of the article to be detected by image processing. In order to enable the radiation detector 33 to accurately receive the radiation from the radiation source 31, a plurality of radiation detectors 33 are provided on the radiation detection apparatus, and a detection face of the radiation detector 33 is directed toward the radiation source 31.

In FIG. 2, the radiation detection apparatus comprises an L-type cantilever 34, on which the radiation detector 33 is provided, while the L-type cantilever 34 is connected to a mounting structure 32 of the radiation source 31, so as to form a door-type scanning frame for passage of an AGV loaded with the container. For FIG. 2, it is to form a door-type scanning frame for passage of an AGV which has accomplished loading of the container. The mounting structure 32 of the radiation source 31 may be a device housing of the radiation source 31, or may be a mounting chamber of the radiation source 31.

The radiation source 31 and the radiation detection apparatus would move together along with the quay crane. In order to effectuate scanning inspection of an AGV loaded with a container, the passage formed by the door-type scanning frame is located on a travelling route of the AGV when the container is loaded by the quay crane. In this way, when the AGV finishes the loading of a container, the scanning inspection process is accomplished by moving along a given travelling route. Under the circumstance that the current AGV continues to travel a distance after loading of the container is completed, its several movement manners available are combined with the scanning inspection, such as to improve the inspection efficiency, and also simplify the control process.

Correspondingly, it is preferable that the door-type scanning frame is located at a front side or a rear side of the AGV and spaced from the AGV by a predetermined distance, in particular adjacent to the front side or the rear side of the AGV, when a container is loaded on the quay crane. The corresponding AGV after the loading of the container is completed forwardly or backwardly goes straight a first preset distance to arrive at the door-type scanning frame, and passes through the door-type scanning frame in a continuous travelling process, to accomplish the scanning inspection.

Considering that the container inspection system is mounted on the quay crane, the radiation source 31 and radiation detector 33 are supplied with power by a power supply unit of the quay crane, such as to save the space occupied by the power supply unit in the container inspection system, and also reduce the influence of the vibration produced by operation of the power supply device over the accuracy of the inspection system. In another embodiment, it is also possible to use such a power supply manner that the radiation source 31 and the radiation detector 33 are power supplied by a power supply device independent from the power supply unit of the quay crane, which power supply device may be a generator, or a battery and the like. Such independent power supply manner can simplify the power allocation solution, and reduce the complexity in control.

In FIG. 2, the L-shaped cantilever 34 includes a horizontal arm and a vertical arm connected to one end thereof, the other end of the horizontal arm being connected to a mounting structure 32 of the radiation source 31. The connection structure may be a fixed connection, i.e. the L-shaped cantilever 34 maintains a form of the door-type scanning frame to move along with the quay crane. In another embodiment, a rotatable connection structure may also be used, i.e. the L-type cantilever 34 is rotatable with respect to the mounting structure 32 of the radiation source 31, to effectuate shifting between a deployed state and a retracted state of the L-type cantilever 34.

The container inspection system of the present application may be applied to a port with a need for container loading and container inspection, and is not only limited to an intelligent port. Among them, the quay crane may be manipulated by manpower, and may also be an automatic quay crane automatically controlled by a control system.

Figure 3:
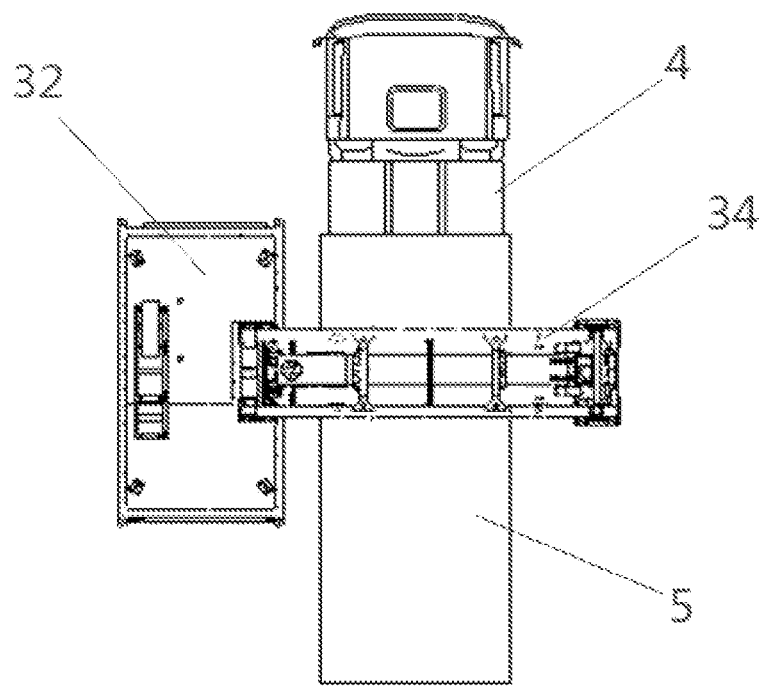
FIG. 3 is a schematic view of a top view angle of an embodiment of the container inspection system of the present application when detecting a passing AGV.
Figure 4:
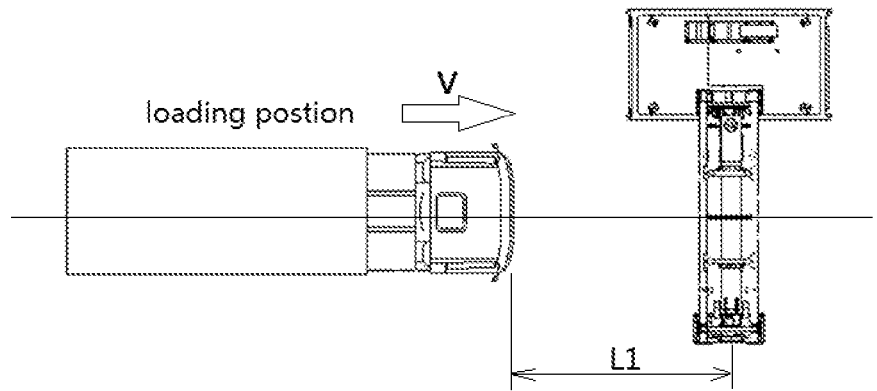
FIGS. 4-6 are respectively schematic views of the process state of an embodiment of the container inspection system of the present application for scanning inspection of an AGV loaded with a container.
Figure 5:
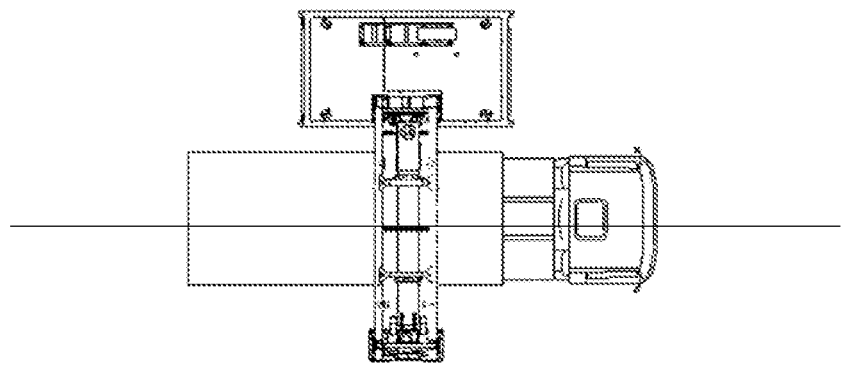
Figure 6:
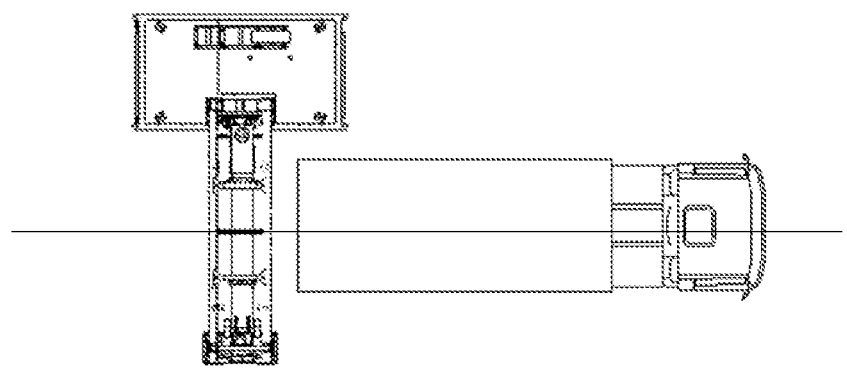

With reference to FIGS. 1-3, when the aforementioned embodiment of the container inspection system of the present application is applied to an intelligent port, the quay crane in the port may be an automatic quay crane 1, which is capable of moving to a loading position of the AGV 4, and hoisting a container 5 onto the AGV 4. In this process, the radiation source 31 and the radiation detection apparatus are preferably mounted on a lateral frame or a bottom frame at one side of the automatic quay crane 1 proximate to the AGV advancing site, so that the radiation source 31 and the radiation detection apparatus move along with the automatic quay crane 1.

Considering that there are a plurality of AGVs in the AGV advancing site, in order to allow the container inspection system to avoid scratching or colliding with other AGVs, it is preferable that the overall occupancy width of the radiation source 31 and the radiation detection apparatus is no greater than a width of an advancing passage of the AGV 4, such as to be able to effectuate passage of the AGV 4 to be scan inspected, without causing an influence over an AGV of an advancing passage at the same time.

On the basis of the aforementioned various container inspection systems, the present application further provides a port facility comprising a quay crane and an AGV advancing site, and the intelligent port facility further comprises the preceding container inspection system. Further, the port facility may be an intelligent port, while the quay crane may be an automatic quay crane 1.

The entire process of loading and scanning inspection of the container is consistent, thereby simplifying operations of the inspection system and AGV between the container loading operation and the scanning inspection operation, and further improving the inspection efficiency.

Finally, it should be explained that the aforementioned embodiments are only used to describe the technical solution of the present application rather than limiting the same; although detailed explanations are made to the present application by referring to preferred embodiments, a common technical person in the art should understand that: it is still possible to make amendments to the embodiments of the present application or make equivalent replacements to part of the technical features; without departing from the spirit and scope of the present application, they should all be covered in the scope of the technical solution for which protection is sought in the present application.

The invention claimed is:

1. A container inspection system, comprising a radiation source, a radiation detection apparatus and a quay crane for hoisting a container onto an automated guided vehicle, said radiation source and said radiation detection apparatus being provided on said quay crane, for performing a scanning inspection on said container loaded on said vehicle, said quay crane is movable, wherein said radiation source and said radiation detection apparatus move along with the quay crane to a loading position on which the quay crane hoists said container onto said vehicle and are configured to perform a scanning inspection of said container on said vehicle.

2. The container inspection system according to claim 1, wherein said radiation detection apparatus comprises a detector, and an L-type cantilever on which said detector is provided, said L-type cantilever being connected to a mounting structure of said radiation source to form a door-type frame for passage of the vehicle loaded with the container.

3. The container inspection system according to claim 2, wherein said L-type cantilever is rotatably connected to the mounting structure of said radiation source, so that the L-type cantilever is able to be switched between a deployed state and a retracted state.

4. The container inspection system according to claim 3, wherein when said radiation source and said radiation detection apparatus move along with said quay crane, said L-type cantilever is folded to be in said retracted state.

5. The container inspection system according to claim 3, wherein when said quay crane reaches said loading position, said L-type cantilever is stretched to be in said deployed state.

6. The container inspection system according to claim 1, wherein when said quay crane hoists the container onto said vehicle, said radiation source and said radiation detection apparatus are located at a front side or a rear side of said vehicle and spaced from said vehicle by a predetermined distance.

7. The container inspection system according to claim 6, wherein said radiation source and said radiation detection apparatus are adjacent to the front side or the rear side of said vehicle.

8. The container inspection system according to claim 1, comprising a power supply unit for supplying power to said radiation source, said detector or/and said quay crane.

9. The container inspection system according to claim 1, wherein said radiation source and said radiation detection apparatus have an overall width that is no greater than a width of an advancing passage of said vehicle.

10. The container inspection system according to claim 1, wherein said radiation source and said radiation detection apparatus are mounted on a lateral frame or a bottom frame of one side of said quay crane proximate to said vehicle advancing site.

11. A port facility, comprising the container inspection system according to claim 1.

12. The port facility according to claim 11, comprising automated guided vehicles for carrying a container.

* * * * *